UNITED STATES PATENT OFFICE.

ADAM FISCHER AND WILHELM FISCHER, OF NEW YORK, N. Y.

IMPROVED IMITATION MARBLE.

Specification forming part of Letters Patent No. 34,746, dated March 25, 1862.

*To all whom it may concern:*

Be it known that we, ADAM FISCHER and WILHELM FISCHER, of the city, county, and State of New York, have invented a new and useful Method of Making Artificial Marble; and we hereby declare the following to be a full, clear, and exact description thereof.

To enable others skilled in the art to make and use our invention, we will proceed to describe its construction and operation.

We take about one pound of alum, dissolve it in water, and then put it in about five gallons of lime-water. Thereby we obtain a precipitate similar to boiled starch. The water is then strained off. To the remainder about one and one-half pound of glue is added and about twelve sheets of thin tissue-paper. The color which the artificial marble is to have when finished is then mixed. This preparation is then boiled and agitated until the whole is made into a homogeneous mass, which may be used for artificial marble of a plain color. To shape the same in thin plates it is spread on waxcloth, which is spanned on a board. The substance is spread on the same about twice as thick as required when finished. It is left there until dry, when it is pressed and cleaned by being well rubbed and polished. It is then fit for use.

To obtain the mass used to imitate the veins in the marble, we proceed in the following manner: Sulphur is boiled in water until a yellow fluid is obtained, which is mixed with dissolved alum, by which a white precipitate results. This substance is then mixed with glue, dissolved paper, and color, and is then boiled. The variegated marble is obtained by spreading the mass first described partially on the oil-cloth, interlining the same diagonally and irregularly with stripes of the second mass, so as to imitate the veins, and when the whole surface of the oil-cloth is thus covered, partly by the first and partly by the second mass, it is left to dry, and is finished as above described.

What we claim as new, and desire to secure by Letters Patent of the United States, is—

The combination of matter, substantially as herein described, for the purpose of making artificial marble, in the manner and for the purpose substantially as described.

ADAM FISCHER.
WILHELM FISCHER.

Witnesses:
CHS. WEHLE,
JOHN P. MOSES.